United States Patent [19]

Hirose

[11] Patent Number: 5,369,630
[45] Date of Patent: Nov. 29, 1994

[54] OPTICAL INFORMATION RECORDING/REPRODUCING APPARATUS HAVING MEANS FOR TRACKING ADJUSTMENT AND A METHOD OF USE THEREFORE

[75] Inventor: Kenji Hirose, Narashino, Japan

[73] Assignee: Canon Kabushiki Kaisha, Tokyo, Japan

[21] Appl. No.: 84,432

[22] Filed: Jun. 30, 1993

Related U.S. Application Data

[63] Continuation of Ser. No. 853,434, Mar. 18, 1992, abandoned.

[30] Foreign Application Priority Data

| Mar. 20, 1991 | [JP] | Japan | 3-080649 |
| Aug. 28, 1991 | [JP] | Japan | 3-240297 |
| Feb. 25, 1992 | [JP] | Japan | 4-038022 |

[51] Int. Cl.⁵ .................................. G11B 7/00
[52] U.S. Cl. ................... 369/100; 369/213
[58] Field of Search ........... 369/100, 213, 30, 32, 369/44.17, 44.18, 44.26, 44.37, 44.38, 109, 111, 114, 266; 359/40, 129, 130, 211, 438, 508, 831

[56] References Cited

U.S. PATENT DOCUMENTS

| 2,329,105 | 9/1943 | Clausen | 369/213 |
| 2,391,784 | 12/1945 | Johnston | 369/213 |
| 2,863,668 | 12/1958 | Lathrop | 369/213 |
| 4,041,532 | 8/1977 | Plows et al. | 369/213 |
| 4,123,780 | 10/1978 | Honjo | 369/213 |
| 4,539,671 | 9/1985 | Higashihara | 369/213 |
| 5,138,592 | 8/1992 | Fujita | 369/44.13 |

FOREIGN PATENT DOCUMENTS

| 4029040 | 3/1991 | Germany. |
| 59-177776 | 10/1984 | Japan. |
| 61-73262 | 4/1986 | Japan. |
| 61-227234 | 10/1986 | Japan. |
| 2087333 | 3/1990 | Japan. |

*Primary Examiner*—Paul M. Dzierzynski
*Assistant Examiner*—Kiet T. Nguyen
*Attorney, Agent, or Firm*—Fitzpatrick, Cella, Harper & Scinto

[57] ABSTRACT

An optical information recording/reproducing apparatus which records, reproduces or erases information by irradiating a disk-like optical information recording medium, supported on a turn table, with a plurality of beam spots through an optical system. A mechanism for moving the turn table in a direction substantially perpendicular to a tracking direction which extends radially from an axis of the information recording medium and intersects at least one of the beam spots, is used to effect tracking adjustment of the beam spots. A mechanism for rotating the plurality of beam spots on the optical axis of the optical system is also used in combination with the turn table moving mechanism to extend the range of tracking adjustment of the plurality of beam spots.

67 Claims, 8 Drawing Sheets

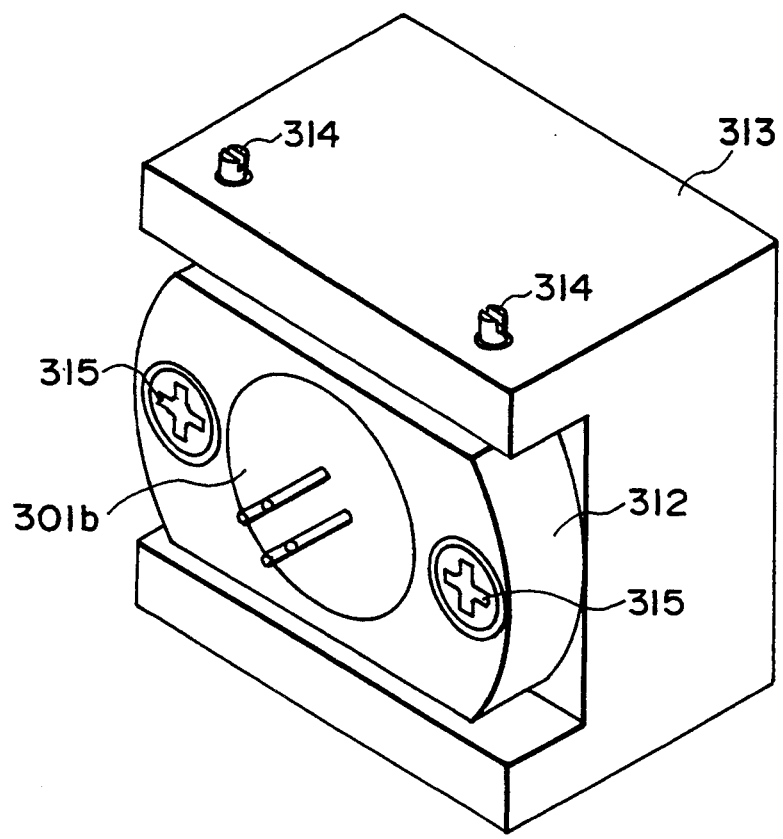
F I G. 12
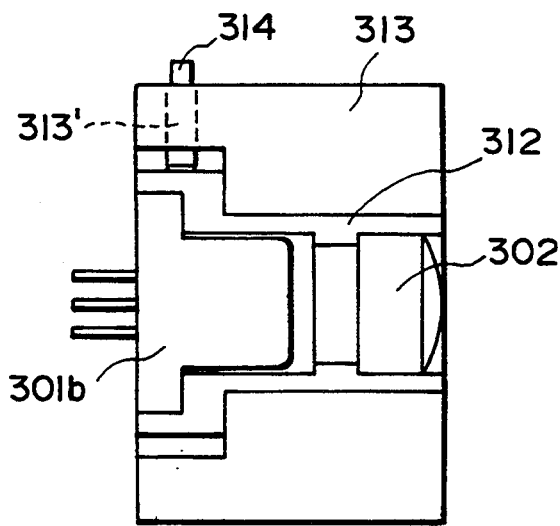
F I G. 13

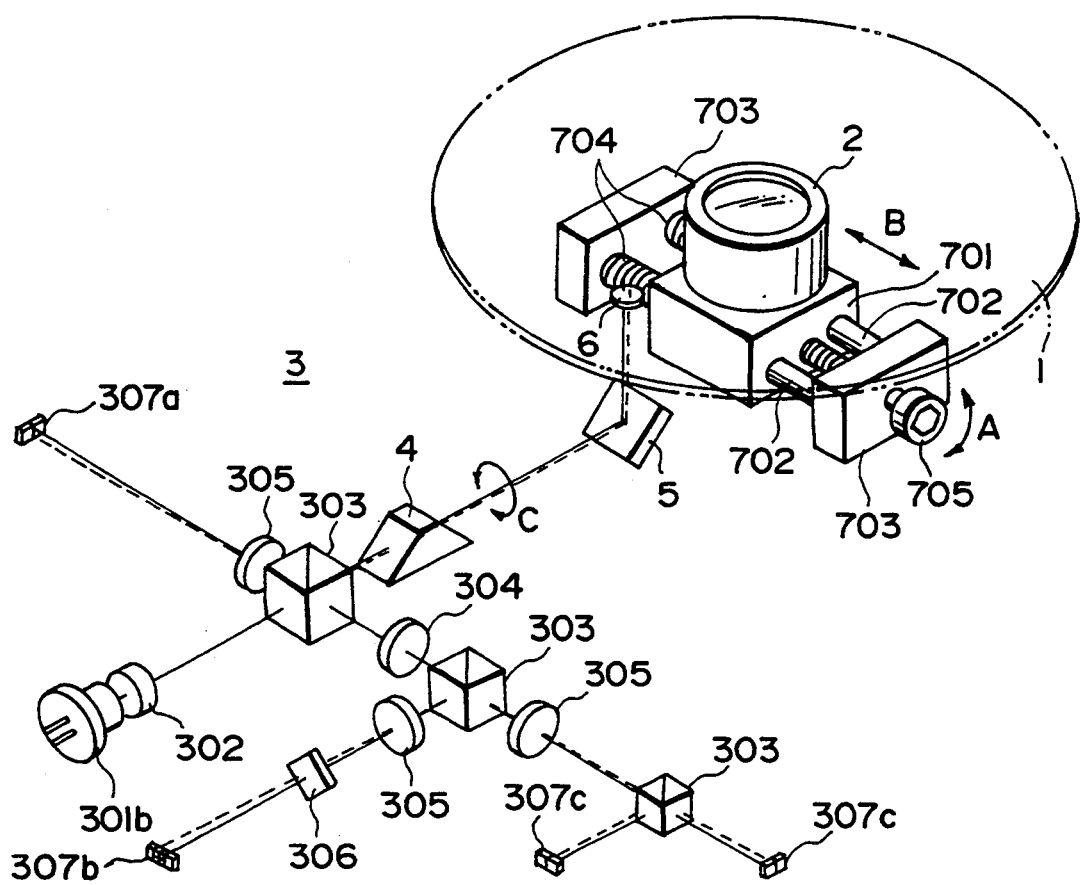
F I G. 14
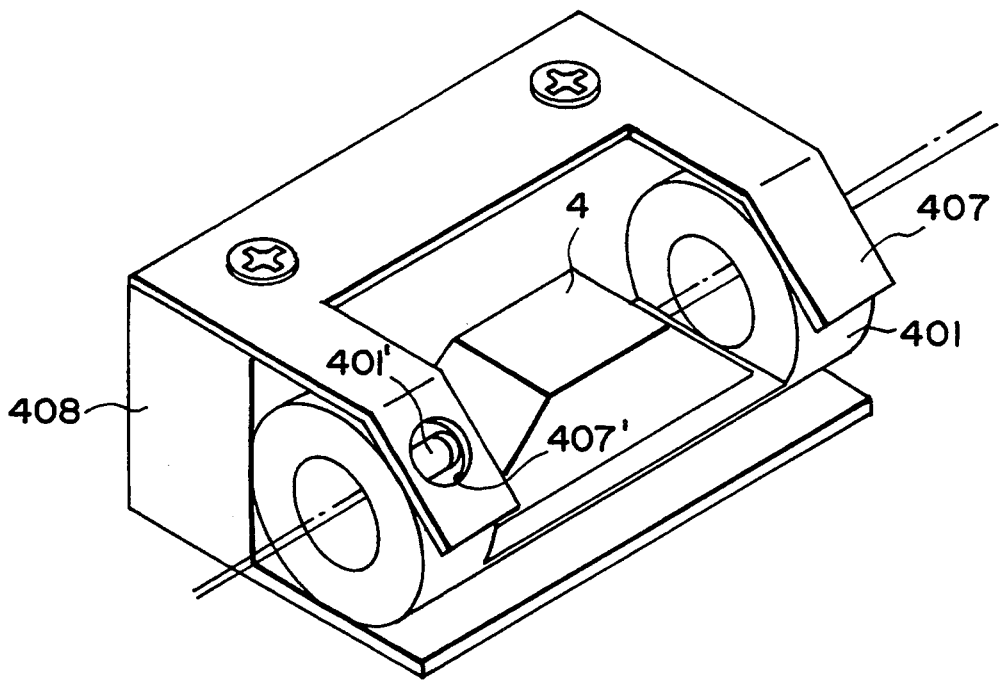
F I G. 15

OPTICAL INFORMATION RECORDING/REPRODUCING APPARATUS HAVING MEANS FOR TRACKING ADJUSTMENT AND A METHOD OF USE THEREFORE

This application is a continuation of application Ser. No. 07/853,434 filed Mar. 18, 1992, now abandoned.

BACKGROUND OF THE INVENTION

1. Field of the Invention

The present invention relates to an optical or optomagnetic type apparatus which optically records, reproduces or erases information on a disk-like optical information recording medium supported on a turn table by irradiating the medium with a plurality of beam spots.

2. Description of the Related Art

For optical information recording/reproduction apparatuses of this kind, an arrangement such as that shown in FIG. 1 for irradiating desired information tracks on an optical information recording medium with a plurality of beam spots has been adopted.

In this arrangement, a turn table 2 serves to support a disk-like optical information recording medium 1 and to drive and rotate the recording medium 1. An optical system for irradiating the disk-like optical information recording medium 1 on the turn table 2 with a plurality of beam spots is formed of a fixed optical system 3 fixedly provided on the apparatus, and a movable optical system including a mirror 5 mounted on a carriage (not shown) movable in a radial direction of the recording medium 1 by a linear motor (not shown) and an objective lens 6 driven in a radial direction of the recording medium 1 (beam spot tracking direction) by an actuator (not shown).

In the fixed optical system 3, two laser beams are emitted from a two-beam semiconductor laser array 301 and are led to an image rotating element 4 through a collimator lens 302 and a polarizing prism 303. After light images have been rotated on a reference optical path by the image rotating element 4, the beams are directed to the mirror 5. In the movable optical system, the mirror 5 reflects the laser beams in a direction perpendicular to the recording surface of the recording medium 1, and the objective lens 6 condenses the beams to form desired beam spots on the recording surface of the recording medium 1.

The light reflected from the recording medium 1 is returned from the movable optical system to the fixed optical system, and is led to the polarizing prism 303 via the image rotating element 4 and is led to light receiving elements 307a, 307b, and 307c through a condenser lens 305, a ½ wavelength plate 304, other polarizing Prism 303, a condenser lens 305 and a cylindrical lens 306. An image rotating prism is ordinarily used as the image rotating element 4.

The light receiving element 307a is used to obtain information for automatic power control of the 2-beam semiconductor laser array 301. One of the two beam spots on the recording medium 1 is used as a servo system for tracking and focusing of the beam spots on information tracks, and information for this servo system is obtained from the light receiving element 307b. Reproduction signals of read information are obtained from the light receiving element 307c.

It is possible to effect initial tracking adjustment of the beam spots on the recording surface of the recording medium 1 by rotating the iamge rotating element 4 in the directions of arrows c in FIG. 1. As a method of imaging the beam spots on information tracks, methods such as those shown in FIGS. 2 and 3 are known. If two beam spots are irradiated on the same information track as shown in FIG. 2, a direct-verification system is adopted in which information is written with a beam spot b and, immediately after this writing, the written information is checked by being read out with a beam spot a which follows the beam spot b. If two beams are irradiated on different tracks as shown in FIG. 3, a system for simultaneously reading/writing information with two beam spots is adopted.

To obtain sufficiently high recording or reproduction performance, it is necessary to adjust two beam spots to the desired information tracks at a precision on the submicron order. To do so, a mechanism for rotating the image rotating element 4 with high accuracy and high resolution is required. FIG. 4 shows a perspective view of a mechanism for rotating an image rotating prism provided as a conventional image rotating element 4. The image rotating prism 4 is bonded to a rotating base 401 which is rotatably supported on an attachment plate 403 fixed in the fixed optical system 3. Reduction gears 404 and a worm gear 406 are engaged with the attachment plate 403. The worm gear 406 engages with a threaded portion 402 formed in a rotating base 401. As the gear 405 is rotated with a wrench, the rotating base 401 is rotating at a speed reduced by the gears to rotate and move the beam spot by a small angle.

In the above-described conventional apparatus, however, initial fine tracking adjustment is effected by using only the mechanism for rotating the image rotating element and it is therefore necessary to increase the accuracy and adjustment sensitivity of the rotating mechanism. Therefore problems arise including a complicated construction of the apparatus, an increase in manufacturing cost and an increase in adjustment time. Also the number of reflecting surfaces in the optical path of the optical system is increased by one to cause a phase difference which causes a deterioration in the signal reproduction performance.

SUMMARY OF THE INVENTION

In view of these circumstances, an object of the present invention is to provide an optical information recording/reproduction apparatus having a simple and low-cost construction for on-track adjustment of a plurality of beam spots.

To achieve this object, according to one embodiment of the present invention, in an optical information recording/reproduction apparatus for recording, reproducing or erasing information by irradiating a disk-like optical information recording medium supported on a turn table with a plurality of beam spots through an optical system, there is provided a means for moving the turn table in a direction perpendicular to direction of tracking of the beam spots, and the tracking adjustment of the beam spots is effected by using the turn table moving means.

Further, a means for rotating the plurality of beam spots with respect to the optical axis of the optical system as the rotation center is provided and is used in combination with the turn table moving means to extend the range of tracking adjustment of the plurality of beam spots.

The turn table is moved as described above to rotate the beam spots relative to the recording medium surface, thereby effecting initial tracking adjustment of the plurality of beam spots.

Initial tracking adjustment of the beam spots may be effected in such a manner that the beam spot position is roughly adjusted by rotating the plurality of beam spots relative to the recording medium surface by the means for rotating the beam spots, and the turn table is moved so that the beam spots are rotated finely relative to the recording medium surface to be finely adjusted.

BRIEF DESCRIPTION OF THE DRAWINGS

FIG. 12 is a diagram of a light beam rotating mechanism of the third embodiment;

FIG. 13 is another diagram of a light beam rotating mechanism of the third embodiment;

FIG. 14 is a diagram of an optical information recording/reproduction apparatus in accordance with a fourth embodiment of the present invention; and FIG. 15 is a diagram of a light beam rotating mechanism of the fourth embodiment.

DESCRIPTION OF THE PREFERRED EMBODIMENTS

Figure 1:
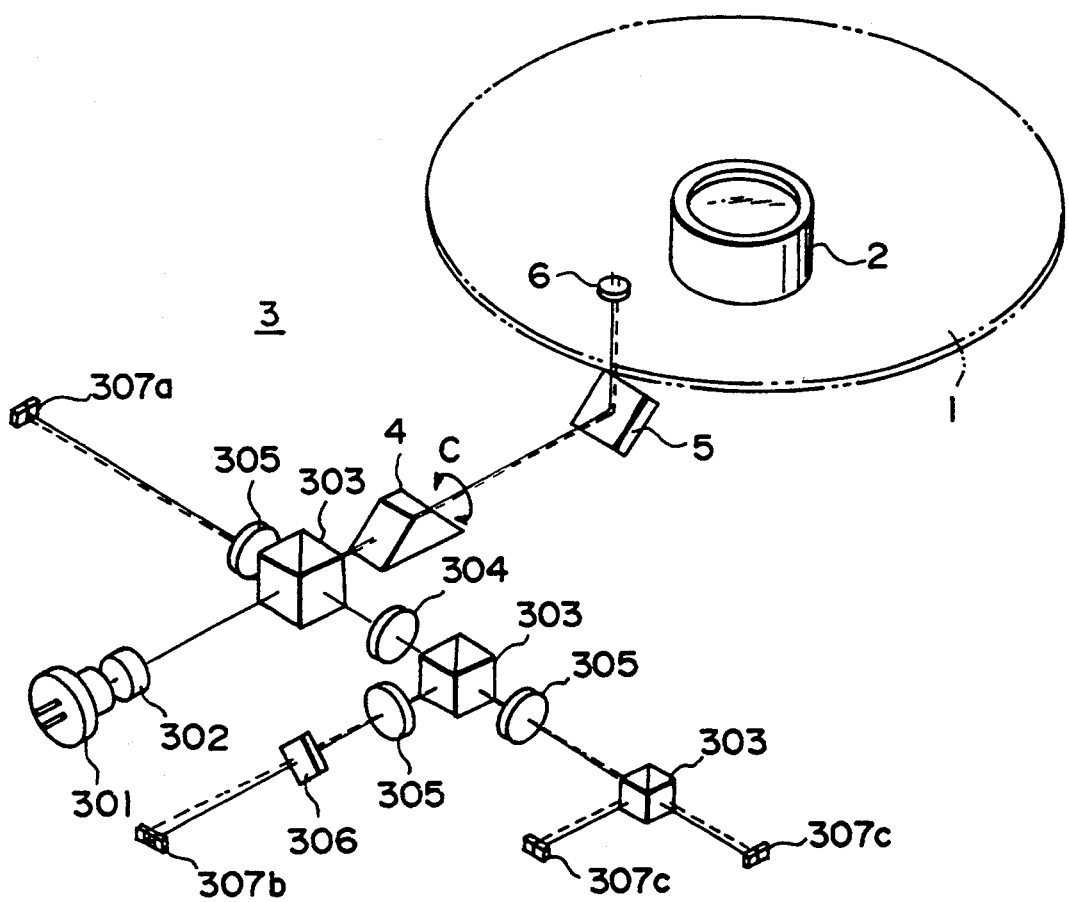
FIG. 1 is a diagram of the conventional optical information recording/reproduction apparatus.
Figure 2:
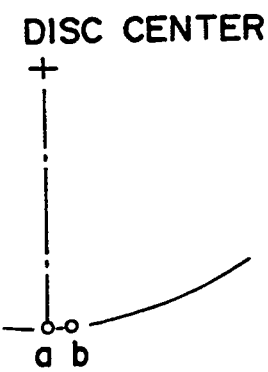
FIG. 2 is a diagram of the disposition and the function of beam spots in the conventional apparatus.
Figure 3:
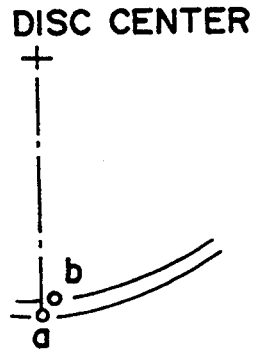
FIG. 3 is another diagram of the disposition and the function of beam spots in the conventional apparatus.
Figure 4:
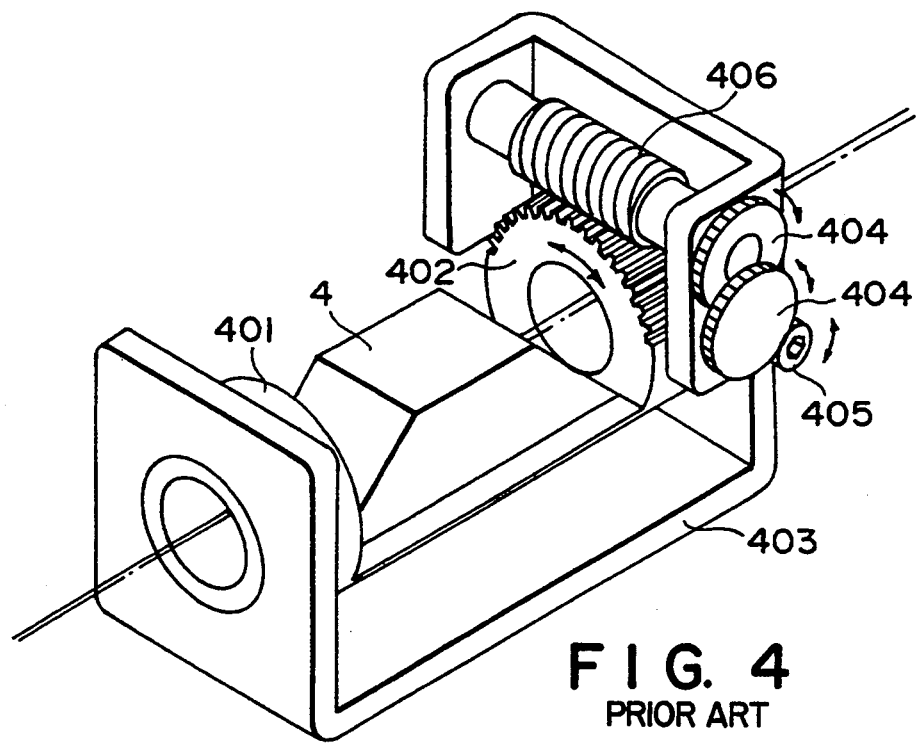
FIG. 4 is a diagram of a mechanism for rotating an image rotating prism provided as an image rotating means.

An optical information recording/reproducing apparatus in accordance with the first embodiment of the present invention will be described below with reference to FIG. 5. The same components as those of the conventional apparatus described above are indicated by the same reference characters and the description for them will not be repeated. This embodiment has no image rotating element but has a means for moving a turn table 2 in a direction perpendicular to the axis of rotation of the turn table 2 and to the beam spot tracking direction, in place of the image rotating element 4.

In this embodiment, a two-beam semiconductor laser array 301 is used as a light source and is disposed so that a plane including the axes of two beams emitted from the laser array is parallel to the disk surface. In this embodiment, one of the two beam spots which passes across an information track in the disk surface before the other is called a leading beam spot, and the other beam spot which then passes across the same information track is called a trailing beam spot. From reflected light of the leading beam spot from the disk surface, a servo signal for servo operation for focusing and tracking of the beam spots on information tracks is obtained.

Figure 5:
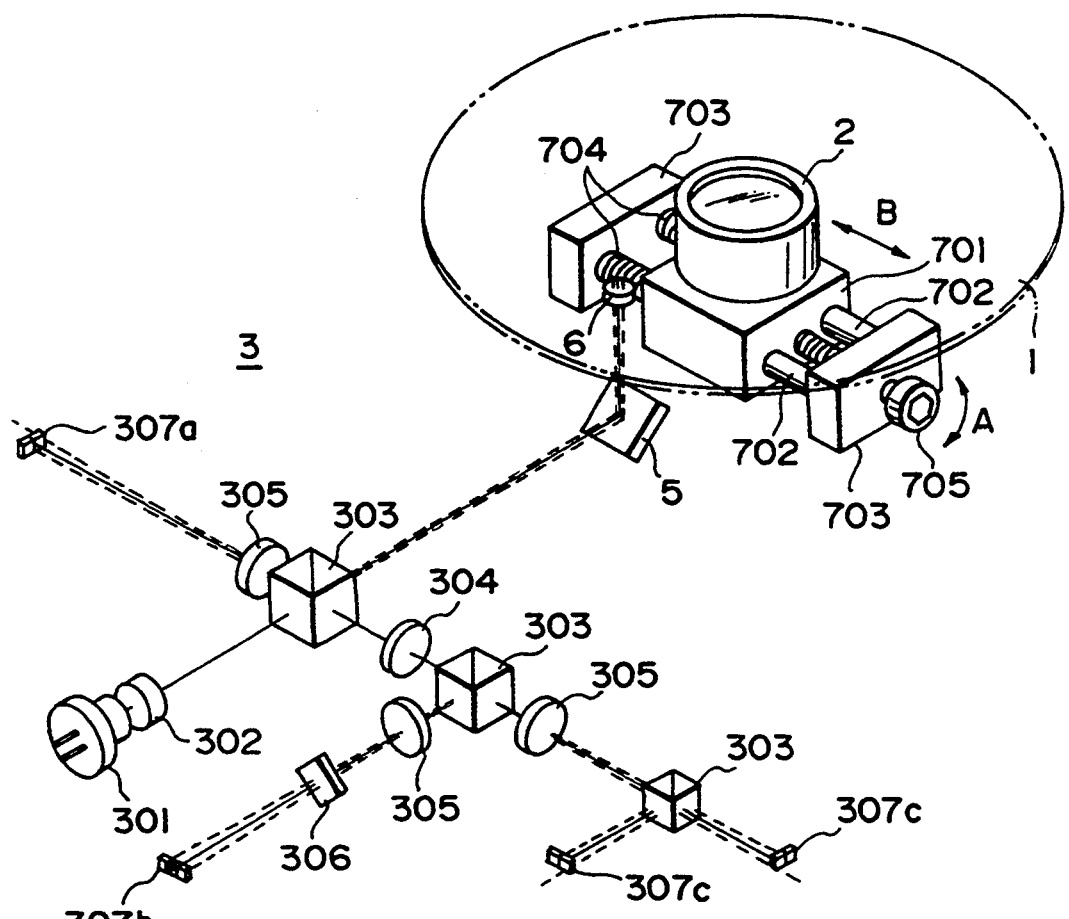
FIG. 5 is a diagram of an optical information recording/reproduction apparatus in accordance with a first embodiment of the present invention.

A transport base 701 is provided which is movable in a direction perpendicular to the tracking direction of the beam spot, i.e., the transport base 701 is movable in the direction in which information tracks extend or, in other words, the direction of the arrow B in FIG. 5, while supporting the turn table 2. Guide rails 702 serve to guide the transport base 701. The guide rails 702 extend in a direction perpendicular to the tracking direction. Holder members 703 serve to hold opposite ends of the guide rails 702 and are fixed on a main body (not shown) of the optical information recording/reproduction apparatus. Compression springs are interposed between one of the holder members 703 and the transport base 701 to urge the transport base 701 in one direction. A feed screw 705 screwed through the other of the holder members 703 is screwed into the transport base 701. The transport base 701 can be moved in the direction of the arrow B along the guide rails 702 by rotating the screw 705 in the direction of the arrow A in FIG. 5.

The method of initial tracking adjustment of the two beam spots will be described below. If each element of the optical system is formed within a design tolerance, the two beam spots are positioned on the same information track. Then, the servo system for focusing/tracking on the information track is activated by using the leading beam spot, and a signal having a single frequency is recorded in the information track in the disk surface. The recorded signal is then read out with the trailing beam spot. During this operation, the turn table is moved so as to maximize the value C/N of the reproduction signal of the trailing beam.

Figure 6:
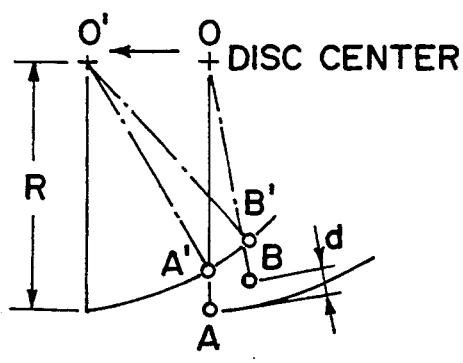
FIG. 6 is a diagram of the positional relationship between the movement of the turn table center and the beam spots.

FIG. 6 schematically shows the movement of the beam spots on the disk surface during this operation. As shown in FIG. 6, if at an initial stage the center of rotation of the turn table 2, i.e., the disk-like recording medium 1 is located on an extension line of the optical axis of the beam spot A while the beam spot B is at a distance d from the target information track, the amount d of movement of the beam spot B to the target information track in case of moving the transport base 701 by very small amount can be expressed by the following formula:

$$d = H \cdot I / R$$

where H is the distance between the two beam spots, I is the amount of movement of the transport base, and R is the radial position of the beam spots from the center of the recording medium.

For example, when the beam spot distance H=20 m, the amount I of movement=50 $\mu$m and R=24 mm, the amount of movement of the beam spot B to the information track is 0.04 $\mu$m. Thus, the amount of relative movement of the beam spots caused by rotation is small in comparison with the amount of movement of the turn table, and the turn table moving mechanism may therefore have low resolving power. There is no need to improve the accuracy of this mechanism and the apparatus can be designed so as to limit the manufacturing cost.

If a mechanism for moving the turn table in a direction perpendicular to the tracking direction is provided as in the case of this embodiment, a mechanism required for intial tracking adjustment of the two beam spots can be simplified.

Figure 7:
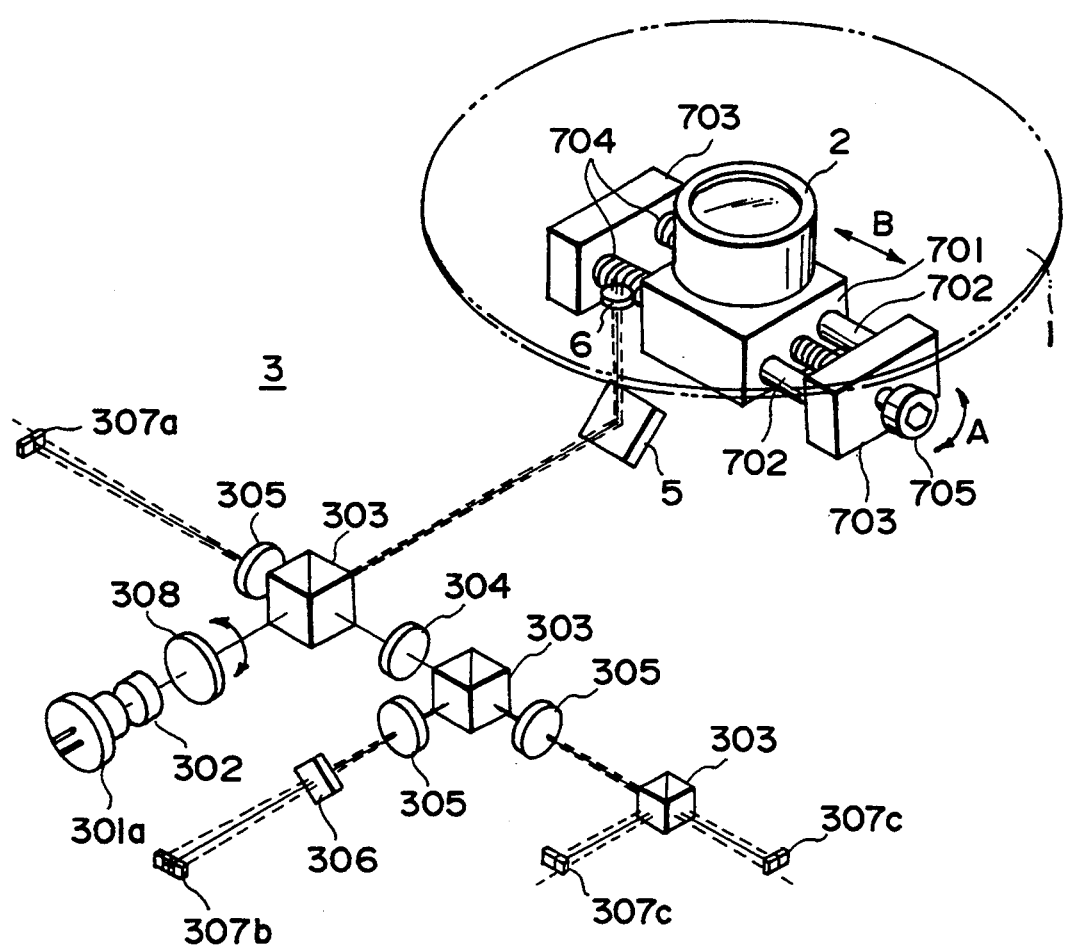
FIG. 7 is a diagram of an optical information recording/reproduction apparatus in accordance with a second embodiment of the present invention.

An optical information recording/reproducing apparatus in accordance with the second embodiment of the present invention will be described below with reference to FIG. 7. The same components as those of the conventional apparatus and the first embodiment are indicated by the same reference characters and the description for them will not be repeated.

Figure 8:
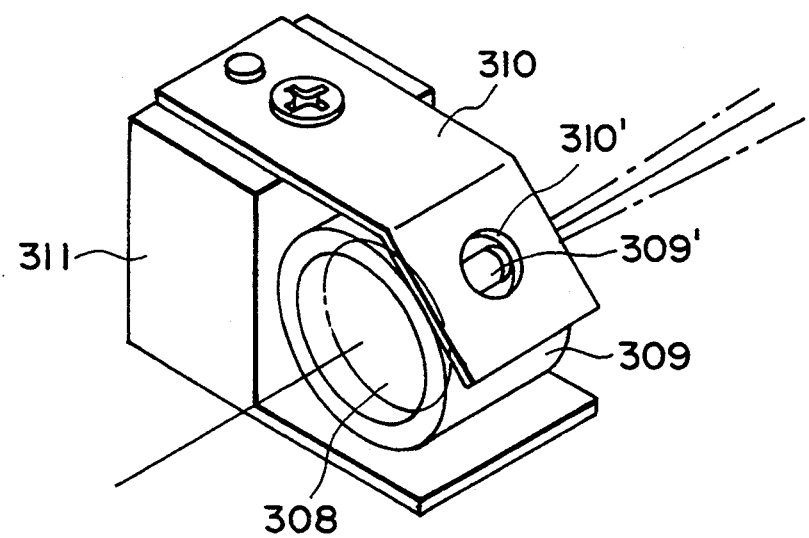
FIG. 8 is a diagram of a light beam rotating mechanism of the second embodiment.

In this embodiment, a one-beam laser 301a is used as a light source, and one light beam is separated into a plurality of light beams on the optical axis by a diffraction grating 308. In this embodiment, two light beams, i.e., one beam of 0-order light in the plurality of light beams and one of two beams of 1st-order light are used. The 0-order light beam is used to form a leading beam spot while the 1st-order light beam is used to form a trailing beam spot. The diffraction grating 308 is supported on a barrel 309 as shown in FIG. 8. The barrel 309 is urged by a plate spring 310 to abut against an abutment surface 311 of a fixed member.

Figure 9:
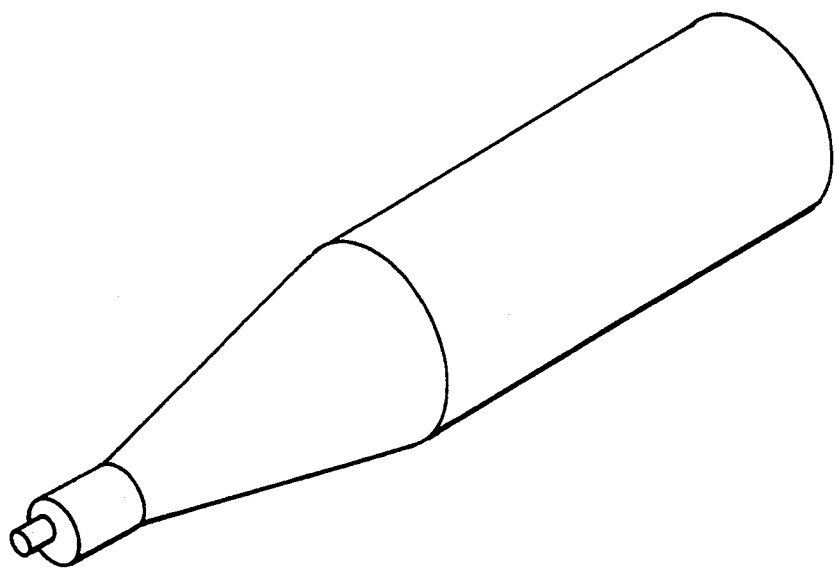
FIG. 9 is a diagram of an eccentric pin rotated while being engaged with the light beam rotating mechanism shown in FIG. 4.

An elongated groove 309' and a round hole 310' are formed in contact portions of the barrel 309 and the plate spring 310, respectively. An eccentric pin such as that shown in FIG. 9 is inserted into the hole 310' and engaged with the groove 309' to support the barrel 309 in such a manner that the barrel 309 can be rotated on the optical axis by the rotation of the eccentric pin. Consequently, the plurality of light beams are rotated in synchronization with the rotation of the barrel 309. The turn table 2 can be moved in a direction perpendicular to the tracking direction, i.e., the turn table can be moved in the direction of the arrow B in FIG. 7 by the same arrangement as the first embodiment.

In the method of beam spot tracking adjustment in the apparatus of the second embodiment, the diffraction grating 308 is rotated on the optical axis of the fixed optical system 3 to roughly position the beam spots, and the turn table is thereafter moved to finely adjust the beam spots to the desired position.

The method of initial tracking adjustment of the beam spots will be described below. First, the system for automatic tracking of the leading beam spot is activated and the writing system is powered. Simultaneously, a magnetic field applied from an unillustrated magnetic head to the recording medium at the position where the leading beam spot is irradiated is modulated in accordance with a certain pattern to record a signal. Immediately after this recording, the recorded signal is reproduced with the trailing beam spot and the time difference between the signal recording and the signal reproduction is measured.

Figure 10:
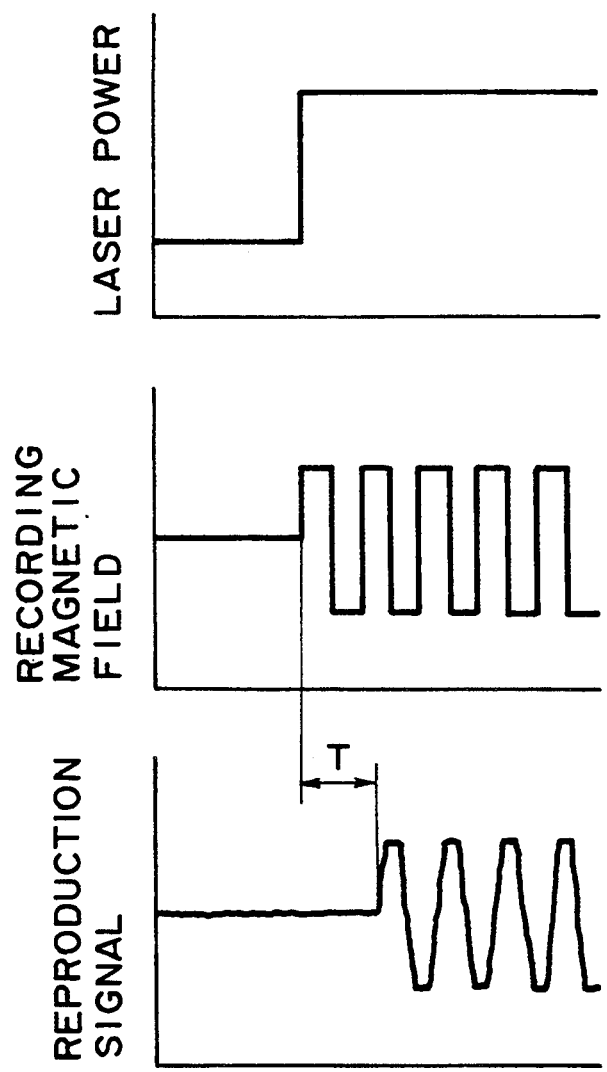
FIG. 10 is a diagram of a timing relationship between a recording signal and a reproduction signal.

The state in which the two beam spots are located or not located on the same information track can be discriminated from the relationship between the recording signal and the reproduction signal with respect to time. FIG. 10 schematically shows a time relationship between the recording signal and the reproduction signal. If as shown in FIG. 10 the time difference T between the rises of the two signals is equal to the value expressed by the following equation:

$$T = (60 \cdot H)/(N \cdot 2\pi \cdot R)$$

where N is the number of revolutions of the disk, H is the distance between the beam spots, and R is the radial position of the spots, it is possible to determine that the two beam spots are positioned on the same information track.

For example, when the number of disk revolutions N=3,000 rpm, the beam spot distance H=20 μm and R=24 mm, the time difference between the signals on the same information track is 2.65 μsec.

Then the diffraction grating is rotated to set this time difference T. After the beam spots have been placed on the same information track, one-frequency recording is effected with the leading beam spot, a signal thereby recorded is reproduced with the trailing beam spot, and the diffraction grating is roughly adjusted to a position such as to maximize C/N of the reproduction signal. At this time, the diffraction grating may not be adjusted to the desired position with sufficiently high accuracy because the adjustment sensitivity of the mechanism for rotating the diffration grating in this embodiment is insufficient, although this mechanism is simple. The turn table is therefore moved to finely adjust the diffraction grating as in the case of the first embodiment. As described above with respect to the first embodiment, the turn table moving mechanism can have a suitable adjustment sensitivity without improving the precision of the turn table. It can therefore have a simple construction and manufactured at a low cost.

In this embodiment, the two functions of rough adjustment and fine adjustment are separately achieved by the two mechanisms, i.e., the mechanism for rotating the diffraction grating and the mechanism for moving the turn table. Each mechanism can therefore have a simple and low-cost construction while achieving the adjustment range and the adjustment sensitivity necessary for initial beam spot tracking adjustment.

Figure 11:
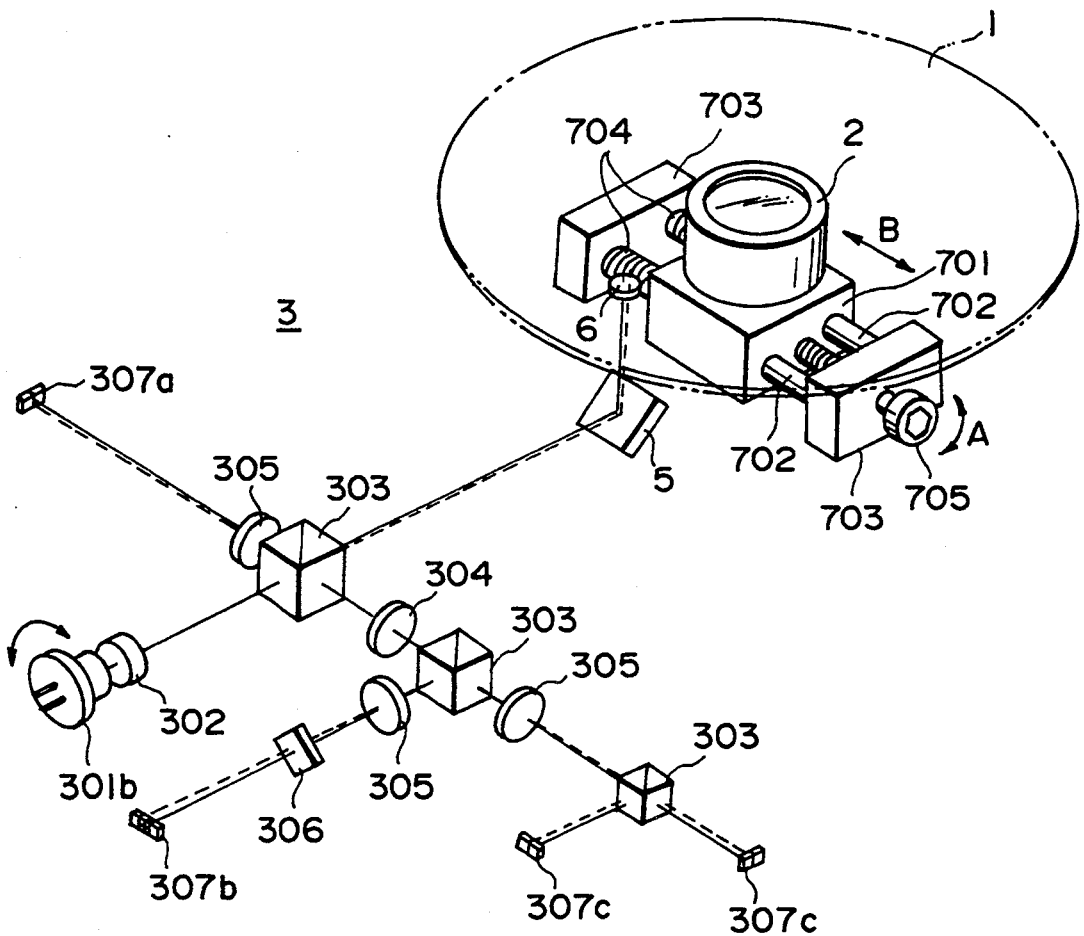
FIG. 11 is a diagram of an optical information recording/reproduction apparatus in accordance with a third embodiment of the present invention.

An optical information recording/reproducing apparatus in accordance with the third embodiment of the present invention will be described below with reference to FIG. 11. The same components as those of the conventional apparatus and the above-described embodiments are indicated by the same reference characters and the description for them will not be repeated.

In this embodiment, a two-beam semiconductor laser array 301b is used as a light source for generating a plurality of light beams, and the laser array 301b is directly rotated on the optical axis of a fixed optical system 3 to rotate beam spots. FIG. 12 shows a perspective view of a mechanism for rotating the laser array 301b, and FIG. 13 shows a cross-sectional view of the laser array taken along a line corresponding to the optical axis in FIG. 12. As shown in FIGS. 12 and 13, a laser mirror barrel 312 holds the two-beam semiconductor laser array 301b and a collimator lens 302, and an outer cylindrical portion of the barrel 312 is rotatably fitted in a holder member 313 which is fixed on the optical head. Two screw holes 313' are formed in an upper surface of the holder member 313. The barrel 312 is rotated by loosening one of adjustment screws 314 and tightening the other adjustment screw 314 to an extent corresponding to the extent of the loosening. The barrel 312 is fixed at a desired position by fastening the screws 314. The same turn table moving mechanism as those of the first and second embodiments is used.

In the apparatus thus constructed, tracking adjustment of the two beam spots is effected by a two-step method in which the semiconductor laser array 301b is first rotated to roughly adjust the beam spots on certain positions on the same information track and the turn table 2 is thereafter moved to finely adjust the beam spots to the desired position.

In this embodiment using a two-beam laser array as a light source, the mechanism for adjusting the laser array and the turn table are also arranged to utilize a combination of the rotation of the laser array and the movement of the turn table and can therefore have the necessary adjustment range and the necessary sensitivity range while being simply arranged.

An optical information recording/reproducing apparatus in accordance with the fourth embodiment of the present invention will be described below with reference to FIG. 14. The same components as those of the conventional apparatus and the above-described embodiments are indicated by the same reference characters and the description for them will not be repeated.

In this embodiment, a two-beam semiconductor laser array 301b is used as a light source as in the case of the third embodiment, while an image rotating prism 4 is used as a means for rotating the beam spots as in the case of the conventional apparatus. FIG. 15 shows a mechanism for rotating the image rotating prism 4. The image rotating prism 4 is fixed by bonding on a rotatable base 401 which is maintained in abutment against an abutment surface 408 of a fixed optical head by a plate spring 407. An elongated hole 401' and a round hole 407' are respectively formed in contact portions of the rotatable base 401 and the plate spring 407. An eccentric pin such as that shown in FIG. 9 is inserted into the elongated hole 401' and the round hole 407' and is rotated to rotate the rotatable base 401. The same turn table moving mechanism as those of the first and second embodiments is used.

In the apparatus thus constructed, initial tracking adjustment of the beam spots is effected by rotating the image rotating prism 4 with respect to the optical axis of the fixed optical system 3 to roughly position the beam spots and by thereafter moving the turn table 2 to finely adjust the beam spots to the desired position.

In this embodiment using a laser array having a plurality of laser beams as a light source as in the case of the second embodiment and having the laser array not rotated but fixed, the mechanisms for adjusting the image rotating element and the turn table are also arranged to utilize a combination of the rotation of the image rotating element and the movement of the turn table and can therefore have a simple construction while only achieving an ordinary manufacture precision.

As described above, according to the present invention in the optical information recording/reproducing apparatus for recording, reproducing or erasing information by irradiating a disk-like optical information recording medium supported on the turn table with a plurality of beam spots through an optical system in accordance with the present invention, there is provided means for moving the turn table in a direction perpendicular to the beam spot tracking direction, and the tracking adjustment of the beam spots is effected by using the turn table moving means.

By this arrangmeent, the optical information recording/reproducing apparatus according to the present invention is capable of effecting beam spot on-track adjustment while having a simple inexpensive construction.

Further, means for rotating the plurality of beam spots on the optical axis of the optical system is provided and is used in combination with the turn table moving means to extend the range of tracking adjustment of the plurality of beam spots.

Thus, the means for rotating the plurality of beam spots and the means for moving the turn table in a direction perpendicular to the tracking direction are provided and respectively have separate functions for rough adjustment and fine adjustment. It is thereby possible for the apparatus, which is simple and inexpensive as a whole, to have the adjustment range and the adjustment sensitivity necessary for initial tracking adjustment of the plurality of beam spots.

What is claimed is:

1. An optical information recording-reproducing apparatus comprising:
    means for forming a plurality of beam spots on an information recording medium to effect at least one of (i) recording information, (ii) reproducing information, and (iii) erasing information;
    drive means for rotatably driving the information recording medium; and
    means for moving said drive means in a direction substantially perpendicular to a tracking direction which extends radially from an axis of the information recording medium and intersects at least one of the plurality of beam spots.

2. An apparatus according to claim 1, wherein said means for forming a plurality of beam spots includes a semiconductor laser array.

3. An apparatus according to claim 1, wherein said means for forming a plurality of beam spots includes a semiconductor laser and a diffraction grating.

4. An apparatus according to claim 1, wherein the direction substantially perpendicular to the tracking direction is substantially parallel to a direction along which information tracks of the information recording medium extend.

5. An apparatus according to claim 1, wherein the plurality of beam spots formed on the information recording medium effect information recording by using a leading beam spot and effect information reproducing by using a following beam spot.

6. An optical information recording-reproducing apparatus comprising:
    optical means for forming a plurality of beam spots on an information recording medium to effect at least one of (i) recording information, (ii) reproducing information, and (iii) erasing information;
    drive means for rotatably driving the information recording medium;
    means for moving said drive means in a direction substantially perpendicular to a tracking direction which extends radially from an axis of the information recording medium and intersects at least one of the plurality of beam spots; and
    means for rotating the plurality of beam spots about an optical axis of said optical means as a center of rotation.

7. An apparatus according to claim 6, wherein said optical means includes a semiconductor laser array.

8. An apparatus according to claim 7, wherein said means for rotating the plurality of beam spots rotates said semiconductor laser array.

9. An apparatus according to claim 6, wherein said optical means includes a semiconductor laser and a diffraction grating.

10. An apparatus according to claim 9, wherein said means for rotating the plurality of beam spots rotates said diffraction grating.

11. An apparatus according to claim 6, wherein said optical means includes a semiconductor laser array and an image rotation prism.

12. An apparatus according to claim 11, wherein said means for rotating the plurality of beam spots rotates said image rotation prism.

13. An apparatus according to claim 6, wherein the direction substantially perpendicular to the tracking direction is substantially parallel to a direction along which information tracks of the information recording medium extend.

14. An apparatus according to claim 6, wherein the plurality of beam spots formed on the information recording medium effect information recording by using a leading beam spot and effect information reproducing by using a following beam spot.

15. A method of adjusting beam spots in an optical information recording-reproducing apparatus comprising the steps of:
   forming, on an information recording mediums, a plurality of beam spots used to effect at least one of (i) recording information, (ii) reproducing information, and (iii) erasing information; and
   moving a drive means for rotatably driving the information recording medium in a direction substantially perpendicular to a tracking direction which extends radially from an axis of the information recording medium and intersects at least one of the plurality of beam spots.

16. A method according to claim 15, wherein the direction substantially perpendicular to the tracking direction is substantially parallel to a direction along which information tracks of the information recording medium extend.

17. A method according to claim 15, wherein the plurality of beam spots formed on the information recording medium effect information recording by using a leading beam spot and effect information reproducing by using a following beam spot.

18. A method of adjusting beam spots in an optical information recording-reproducing apparatus comprising the steps of:
   forming, on an information medium, a plurality of beam spots used to effect at least one of (i) recording information, (ii) reproducing information, and (iii) erasing information, by using an optical means;
   moving a drive means for rotatably driving the information recording medium in a direction substantially perpendicular to a tracking direction which extends radially from an axis of the information recording medium and intersects at least one of the plurality of beam spots; and
   rotating the plurality of beam spots about an optical axis of the optical means as a center of rotation.

19. A method according to claim 18, wherein the optical means includes a semiconductor laser array.

20. A method according to claim 18, wherein the optical means includes a semiconductor laser and a diffraction grating.

21. A method according to claim 18, wherein the optical means includes a semiconductor laser array and an image rotation prism.

22. A method according to claim 18, wherein the direction substantially perpendicular to the tracking direction is substantially parallel to a direction along which information tracks of the information recording medium extend.

23. A method according to claim 18, wherein the plurality of beam spots formed on the information recording medium effect information recording by using a leading beam spot and effect information reproducing by using a following beam spot.

24. A method of adjusting a plurality of beam spots in an optical information recording-reproducing apparatus, comprising the steps of:
   forming a plurality of beam spots on an information recording medium by using an optical means which includes a semiconductor laser array; and
   moving a driving means for rotationally driving the information recording medium in a direction substantially perpendicular to a tracking direction which extends radially from an axis of the information recording medium and intersects at least one of the plurality of beam spots.

25. A method according to claim 24, wherein the direction substantially perpendicular to the tracking direction is substantially parallel to a direction along which information tracks of the information recording medium extend.

26. A method according to claim 24, wherein the plurality of beam spots formed on the information recording medium effect information recording by using a leading beam spot and effect information reproducing by using a following beam spot.

27. A method of adjusting a plurality of beam spots in an optical information recording-reproducing apparatus, comprising the steps of:
   forming a plurality of beam spots on an information recording medium by using an optical means which includes a semiconductor laser and a diffraction grating; and
   moving a driving means for rotationally driving the information recording medium in a direction substantially perpendicular to a tracking direction which extends radially from an axis of the information recording medium and intersects at least one of the plurality of beam spots.

28. A method according to claim 27, wherein the direction substantially perpendicular to the tracking direction is substantially parallel to a direction along which information tracks of the information recording medium extend.

29. A method according to claim 27, wherein the plurality of beam spots formed on the information recording medium effect information recording by using a leading beam spot and effect information reproducing by using a following beam spot.

30. A method of adjusting a plurality of beam spots in an optical information recording-reproducing apparatus, comprising the steps of:
   forming a plurality of beam spots on an information recording medium by using an optical means which includes a semiconductor laser array;
   moving a driving means for rotationally driving the information recording medium in a direction substantially perpendicular to a tracking direction which extends radially from an axis of the information recording medium and intersects at least one of the plurality of beam spots; and
   rotating the semiconductor laser array about an optical axis of the optical means as a center of rotation.

31. A method according to claim 30, wherein the direction substantially perpendicular to the tracking direction is substantially parallel to a direction along which information tracks of the information recording medium extend.

32. A method according to claim 30, wherein the plurality of beam spots formed on the information recording medium effect information recording by using a leading beam spot and effect information reproducing by using a following beam spot.

33. A method of adjusting a plurality of beam spots in an optical information recording-reproducing apparatus, comprising the steps of:
   forming a plurality of beam spots on an information recording medium by using an optical means which includes a semiconductor laser and a diffraction grating;
   moving a driving means for rotationally driving the information recording medium in a direction substantially perpendicular to a tracking direction which extends radially from an axis of the information recording medium and intersects at least one of the plurality of beam spots; and
   rotating the diffraction grating about an optical axis of the optical means as a center of rotation.

34. A method according to claim 33, wherein the direction substantially perpendicular to the tracking direction is substantially parallel to a direction along which information tracks of the information recording medium extend.

35. A method according to claim 33, wherein the plurality of beam spots formed on the recording medium effect information recording by using a leading beam spot and effect information reproducing by using a following beam spot.

36. A method of adjusting a plurality of beam spots in an optical information recording-reproducing apparatus, comprising the steps of:
   forming a plurality of beam spots on an information recording medium by using an optical means which includes a semiconductor laser array and an image rotation prism;
   moving a driving means for rotationally driving the information recording medium in a direction substantially perpendicular to a tracking direction which extends radially from an axis of the information recording medium and intersects at least one of the plurality of beam spots; and
   rotating the image rotation prism about an optical axis of the optical means as a center of rotation.

37. A method according to claim 36, wherein the direction substantially perpendicular to the tracking direction is substantially parallel to a direction along which information tracks of the information recording medium extend.

38. A method according to claim 36, wherein the plurality of beam spots formed on the information recording medium effect information recording by using a leading beam spot and effect information reproducing by using a following beam spot.

39. An optical information recording-reproducing apparatus comprising:
   means for forming a plurality of beam spots on an information recording medium to effect at least one of (i) recording information, (ii) reproducing information, and (iii) erasing information;
   drive means for rotatably driving the information recording medium; and
   means for moving said drive means in a predetermined direction perpendicular to a tracking direction of the plurality of the beam spots.

40. An apparatus according to claim 39, wherein said means for forming a plurality of beam spots includes a semiconductor laser array.

41. An apparatus according to claim 39, wherein said means for forming a plurality of beam spots includes semiconductor laser and a diffraction grating.

42. An apparatus according to claim 39, wherein the plurality of beam spots formed on the information recording medium effect information recording by using a leading beam spot and effect information reproducing by using a following beam spot.

43. An optical information recording-reproducing apparatus comprising:
   optical means for forming a plurality of beam spots on an information recording medium to effect at least one of (i) recording information, (ii) reproducing information, and (iii) erasing information;
   drive means for rotatably driving the information recording medium;
   means for moving said drive means in a predetermined direction perpendicular to a tracking direction of the plurality of the beam spots; and
   means for rotating the plurality of beam spots about an optical axis of said optical means as a center of rotation.

44. An apparatus according to claim 43, wherein said optical means includes a semiconductor laser array.

45. An apparatus according to claim 44, wherein said means for rotating the plurality of beam spots rotates said semiconductor laser array.

46. An apparatus according to claim 43, wherein said optical means includes a semiconductor laser and a diffraction grating.

47. An apparatus according to claim 46, wherein said means for rotating the plurality of beam spots rotates said diffraction grating.

48. An apparatus according to claim 43, wherein said optical means includes a semiconductor laser arrival and an image rotation prism.

49. An apparatus according to claim 48, wherein said means for rotating the plurality of beam spots rotates said image rotation prism.

50. An apparatus according to claim 43, wherein the plurality of beam spots formed on the information recording medium effect information recording by using a leading beam spot and effect information reproducing by using a following beam spot.

51. A method of adjusting beam spots in an optical information recording-reproducing apparatus comprising the steps of:
   forming, on an information recording medium, a plurality of beam spots used to effect at least one of (i) recording information, (ii) reproducing information, and (iii) erasing information; and
   moving a drive means for rotatably driving the information recording medium in a predetermined direction perpendicular to a tracking direction of the plurality of the beam spots.

52. A method according to claim 51, wherein the plurality of beam spots formed on the information recording medium effect information recording by using a leading beam spot and effect information reproducing by using a following beam spot.

53. A method of adjusting beam spots in an optical information recording-reproducing apparatus comprising the steps of:
   forming, on an information recording medium, a plurality of beam spots used to effect at least one of (i) recording information, (ii) reproducing information, and (iii) erasing information, by using an optical means;
   moving a drive means for rotatably driving the information recording medium in a predetermined direction perpendicular to a tracking direction of the plurality of the beam spots; and
   rotating the plurality of beam spots about an optical axis of the optical means as a center of rotation.

54. A method according to claim 53, wherein the optical means includes a semiconductor laser array.

55. A method according to claim 53, wherein the optical means includes a semiconductor laser and a diffraction grating.

56. A method according to claim 53, wherein the optical means includes a semiconductor laser array and an image rotation prism.

57. A method according to claim 53, wherein the plurality of beam spots formed on the information recording medium effect information recording by using a leading beam spot and effect information reproducing by using a following beam spot.

58. A method of adjusting a plurality of beam spots in an optical information recording-reproducing apparatus, comprising the steps of:
   forming a plurality of beam spots on an information recording medium by using an optical means which includes a semiconductor laser array; and
   moving a driving means for rotationally driving the information recording medium in a predetermined direction perpendicular to a tracking direction of the plurality of the beam spots.

59. A method according to claim 58, wherein the plurality of beam spots formed on the information recording medium effect information recording by using a leading beam spot and effect information reproducing by using a following beam spot.

60. A method of adjusting a plurality of beam spots in an optical information recording-reproducing apparatus, comprising the steps of:
   forming a plurality of beam spots on an information recording medium by using an optical means which includes a semiconductor laser and a diffraction grating; and
   moving a driving means for rotationally driving the information recording medium in a predetermined direction perpendicular to a tracking direction of the plurality of the beam spots.

61. A method according to claim 60, wherein the plurality of beam spots formed on the information recording medium effect information recording by using a leading beam spot and effect information reproducing by using a following beam spot.

62. A method of adjusting a plurality of beam spots in an optical information recording-reproducing apparatus, comprising the steps of:
   forming a plurality of beam spots on an information recording medium by using an optical means which includes a semiconductor laser array;
   moving a driving means for rotationally driving the information recording medium in a predetermined direction perpendicular to a tracking direction of the plurality of the beam spots; and
   rotating the semiconductor laser array about an optical axis of the optical means as a center of rotation.

63. A method according to claim 62, wherein the plurality of beam spots formed on the information recording medium effect information recording by using a leading beam spot and effect information reproducing by using a following beam spot.

64. A method of adjusting a plurality of beam spots in an optical information recording-reproducing apparatus, comprising the steps of:
   forming a plurality of beam spots on an information recording medium by using an optical means which includes a semiconductor laser and a diffraction grating;
   moving a driving means for rotationally driving the information recording medium in a predetermined direction perpendicular to a tracking direction of the plurality of the beam spots; and
   rotating the diffraction grating about an optical axis of the optical means as a center of rotation.

65. A method according to claim 64, wherein the plurality of beam spots formed on the recording medium effect information recording by using a leading beam spot and effect information reproducing by using a following beam spot.

66. A method of adjusting a plurality of beam spots in an optical information recording-reproducing apparatus, comprising the steps of:
   forming a plurality of beam spots on an information recording medium by using an optical means which includes a semiconductor laser array and an image rotation prism;
   moving a driving means for rotationally driving the information recording medium in a predetermined direction perpendicular to a tracking direction of the plurality of the beam spots; and
   rotating the image rotation prism about an optical axis of the optical means as a center of rotation.

67. A method according to claim 66, wherein the plurality of beam spots formed on the information recording medium effect information recording by using a leading beam spot and effect information reproducing by using a following beam spot.

* * * * *

UNITED STATES PATENT AND TRADEMARK OFFICE
CERTIFICATE OF CORRECTION

PATENT NO. : 5,369,630
DATED : November 29, 1994
INVENTOR(S) : Kenji HIROSE

It is certified that error appears in the above-indentified patent and that said Letters Patent is hereby corrected as shown below:

Title page:

Item [54], "THEREFORE" should read --THEREFOR--.

Item [56], Right Column, under Foreign Patent Documents "2087333 3/1990 Japan" should read --2-87333 3/1990 Japan--.

COLUMN 1

Line 5, "THEREFORE" should read --THEREFOR--.
    Line 54, "other" should read --another--; and "Prism" should read --prism--.

COLUMN 2

Line 1, "iamage" should read --image--.

COLUMN 4

Line 60, "H=20 m," should read --H=20 $\mu$m,--.

COLUMN 6

Line 64, "those" should read --that--.

COLUMN 7

Line 62, "arrangmeent" should read --arrangement--.

UNITED STATES PATENT AND TRADEMARK OFFICE
CERTIFICATE OF CORRECTION

PATENT NO. : 5,369,630                        Page 2 of 2
DATED      : November 29, 1994
INVENTOR(S): Kenji HIROSE It is certified that error appears in the above-indentified patent and that said Letters Patent is hereby corrected as shown below:

COLUMN 9

Line 23, "mediums," should read --medium,--.

COLUMN 12

Line 42, "arrival" should read --array--.

Signed and Sealed this

Twenty-third Day of May, 1995

Attest:

BRUCE LEHMAN

Attesting Officer          Commissioner of Patents and Trademarks